July 18, 1967   H. DRENKELFORT   3,332,056
METHOD AND APPARATUS FOR DISTINCT INDICATION OF SONAR ECHOES
REFLECTED FROM DIFFERENT OR MULTI-LAYER OBJECTS
Filed Jan. 25, 1965   4 Sheets-Sheet 1

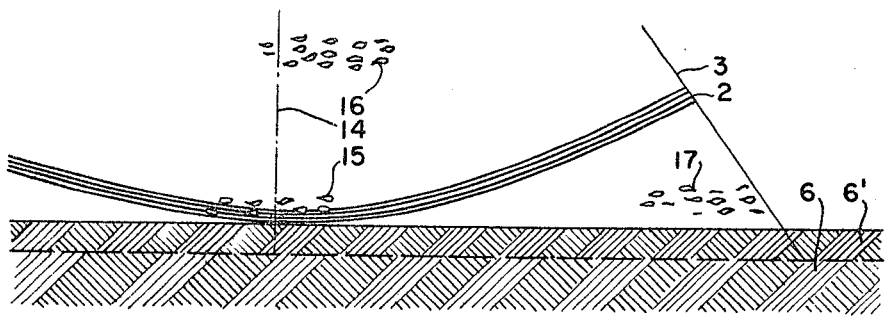
FIG. 4
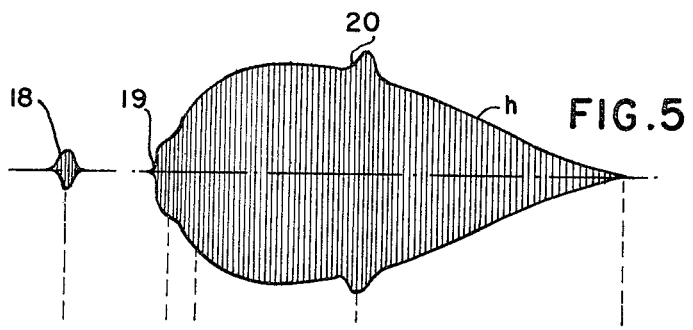
FIG. 5
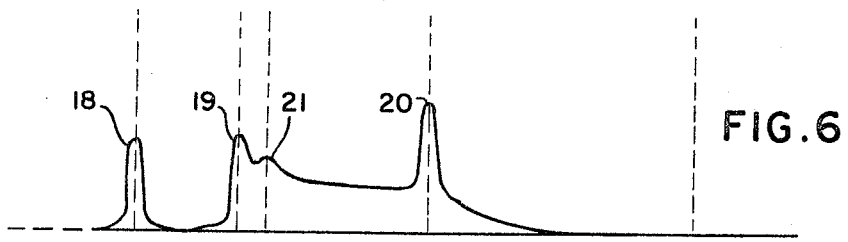
FIG. 6
FIG. 7
FIG. 8
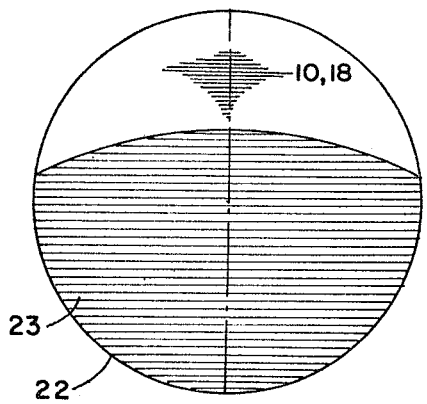
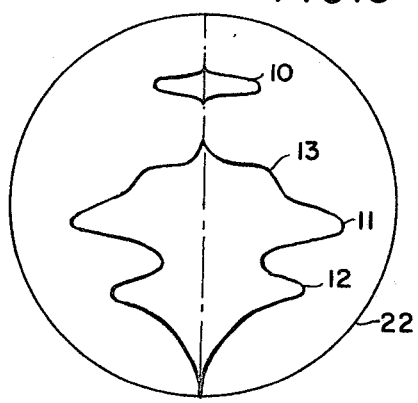

3,332,056
METHOD AND APPARATUS FOR DISTINCT INDICATION OF SONAR ECHOES REFLECTED FROM DIFFERENT OR MULTI-LAYER OBJECTS
Hans Drenkelfort, Kiel-Elmschenhagen, Germany, assignor to Electroacustic Gesellschaft mit beschrankter Haftung, Kiel, Germany, a corporation of Germany
Filed Jan. 25, 1965, Ser. No. 427,984
Claims priority, application Germany, Jan. 23, 1964, E 26,281
19 Claims. (Cl. 340—3)

My invention relates to methods and apparatus for indication of sonar echoes reflected from different or multilayer objects.

Individual submarine objects as well as various parts of an expansive object reflect respective individual echo pulses, all stemming from a single transmitter pulse. In the receiving transducer the reflected echo pulses manifest themselves as a single comprehensive echo signal of complex wave shape in which the amplitudes of simultaneously arriving echo pulses are additively effective at each moment. Often the most interesting objects to be observed reflect only small echo pulse amplitudes. Hence in the complex echo signal, which also comprises echo pulses of high amplitude reflected from non-interesting objects, the relative share stemming from the interesting objects becomes very small. For this reason and since the resolving powers of the echo indicating devices, such as chart recorders or cathode-ray tubes, are limited, the interesting objects in most cases are not indicated or not sufficiently distinctive.

The simultaneous arrival of echo pulses reflected from different objects or object portions comes about as follows. For echo sounding, a train of sonic or ultrasonic waves is transmitted periodically. The propagation of the pulse train takes place only within a finite beam angle or cone, the size and sometimes also the shape of which depend upon the wave length of the transmitted pulse and upon the geometry of the effective radiating surface. Beam-cone angles of approximately 10° are obtainable without appreciable difficulties. Smaller angles require a considerably greater amount of equipment and operating power. This is because the wave length is determined by the reflection properties of the objects being tracked, as well as by the damping properties of the transmitting medium so that a reduction in beam-cone angle can be achieved only by enlarging the geometric dimensions but not by any increase in the frequency of the sound pulses. This results in greater weight and larger space requirements, especially with respect to the mounting and tilting devices. In practice, the narrower radiation beam achievable by enlarged constructions of this kind entails the further disadvantage that rolling and yawing motions of the ship may cause the beam to lose the target object unless automatically stabilized tilting equipment for the large and heavy electrosonic transducer is additionally provided. Due to the narrow bunching of the beam, only a relatively small area can be searched at a time, so that soundings for searching purposes must be often repeated. Despite these disadvantages, sounding equipment with a narrow beam angle is indispensable if objects are to be recognized whose reflected echo pulses are simultaneously received and therefore overlap each other. Such overlapping is due to the width of the beam angle when the sounding direction is at a slant, but it also occurs with a vertical sounding direction, particularly if the sea bottom is sloping, such as at the shelf edge. When each pulses are received simultaneously or in overlapping time relation, they may be reflected from different objects or from different strata of the same object, but this is not apparent from the indicated or recorded echogram, and no remedy is afforded by devices which simply reduce or limit the amplitude of the echo signal received by the transducer to prevent over-controlling the indicating device.

It is an object of my invention, therefore, to minimize the increase in weight, size and investment heretofore resulting from the provision of increased bunching of the sonar beam cone, but to nevertheless afford a sufficiently distinctive indication of different objects or different object layers, so that these are discernible in the echogram or other indication in satisfactory detail, despite the fact that the respective echo pulses, stemming from a single transmitter pulse, arrive simultaneously or nearly simultaneously at the receiving transducer.

Another object of my invention is to afford a reduction in the sonar beam-cone angle while simplifying the equipment needed for this purpose and reducing the cost of providing for such angular restriction of the beam cone.

Still another object of the invention, akin to those mentioned above, is to simplify and improve the use of narrow-beam echo-sounding equipment by minimizing the susceptability of searching or tracking operations to movements of the vessel carrying the sonar equipment.

The invention is based upon the following recognition.

The time curve of a demodulated echo signal which, as explained, is to be looked upon as being a composite of numerous individual echo pulses, may be imagined as subdivided into individual portions having, for example, a length corresponding to the duration of an echo pulse or of a single transmitter-pulse train. Each of these time portions of the demodulated echo signal can be analyzed as being composed of a group of harmonic frequencies in accordance with a Fourier series. The signal portions having a steeper or a cornered shape possess a larger share of frequencies of higher order than the shallower and/or corner-free portions. In conjunction with the present invention, it has been found that the echo pulses reflected from the objects of particular interest in sonar searching and tracking operations, predominantly exhibit frequencies of higher order; and this phenomenon is utilized for effecting a clearer, more distintive indication of the interesting echo pulses not sufficiently representable with the aid of sonar equipment as heretofore available.

More specifically, and in accordance with a feature of the invention, the entire echo signal, comprising the totality of the above-mentioned echo pulses from different objects or object layers, is first demodulated, preferably by subjecting the amplified signal voltage from a sonic-electric transducer to demodulation. Thereafter the demodulated voltage is subjected to amplitude modification by means of one or more networks having frequency-dependent time parameters, so that the portions of the demodulated echo signal predominantly possessing frequencies of the higher order, are augmented in amplitude relative to the other portions of the echo signal received within the same beam cone but possessing predominantly frequencies of the lower order. The voltage curve of the modified echo signal, thus more or less corrected for emphasis upon the time portions possessing a larger share of higher-order frequencies, is applied for controlling or forming the desired echo indication, thus emphasizing the representation of fish or other inhomogeneities of reflective objects.

With the aid of this method, such objects as schools of fish closely above the sea bottom become clearly discernible on the echo indicator, even if the soundings are taken in a slanting direction or when the objects during vertical sounding are located above a sloping bottom or near the edge of the sound beam. In consequence, the heretofore considerable and often excessive expenditures required for reducing the sonar beam angle can be greatly reduced. In addition, the servicing and handling of the sonar equipment is simplified and improved because an object being tracked does not tend to readily leave the sonar beam as a consequence of slight movements of the vessel, without the necessity of providing additional and space-demanding automatic stabilizing devices. Furthermore, the slight bunching of the sonic-electric transducers made readily applicable by virtue of the invention, permits obtaining a survey picture by means of a single sounding operation, thus facilitating, for example, the timely performance of corrections in the position of fishing nets, which also leads to improved catch prospects. Heretofore, when sounding with a particularly sharp bunching of the sonar beam, such a general survey picture of the fishing area could be gained only from several soundings.

According to another feature of the invention, the above-described method is further carried out by subjecting the demodulated echo signal to the effect of a network having a given time constant in which a compensating voltage is derived from the echo signal for compensation of the demodulated signal portions in which the frequencies of lower order predominate. By impressing the compensating voltage upon the demodulated signal, the resulting modified voltage exhibits the just-mentioned lower-order frequency portions in a more or less suppressed manner. As a result, the demodulated echo signal can be corrected to any desired degree in the proper sense so that, for example, the echo reflected by the sea bottom, especially with a sloping or horizontal sounding direction, is also included in the indication in a still recognizable manner and without disturbing the desired emphasis upon the representation of fish or other target objects in the image. Since further the amplitude of an electric voltage can be readily adjusted, the indication is easily and at any time adaptable to local conditions by adjusting a suitable amplitude of the compensating voltage.

Another way of performing the method according to the invention is to modify the echo signal with the aid of two networks whose time constants are different so as to produce two respective demodulating voltages having different voltage-time curves which differently represent the individual portions of the demodulated echo signal. These two demodulated voltages are applied with mutually opposed polarities to effect the desired indication. The apparatus for performing the method in this manner is preferably so designed that, when the echo signal is relatively long and possesses shallow portions stemming, for example, from the sea bottom, the resulting two demodulating voltages differ only slightly from each other and, when conjointly employed, produce a very slight resultant indicating voltage for producing or controlling the image.

According to still another feature of the invention, an apparatus for performing echo soundings by the above-described method comprises a demodulating stage which demodulates the amplified signal voltage supplied from the transducer. The apparatus is further equipped with indicating means, such as a cathode-ray tube or a chart recorder with a travelling stylus, such recording devices being illustrated and described for example in U.S. Patents No. 2,944,868, No. 2,946,647, and No. 3,076,173. Interposed between the demodulator stage and the indicator is a band-pass stage, preferably formed of RC members, or of one or more filter circuits acting as a band pass. The frequency band of the interposed stage is between the carrier frequency and the fundamental frequency of the demodulated echo signal.

While such apparatus are relatively simple and reliable in operation, a further simplification is obtained by combining the band-pass stage entirely or partially with a network for filtering the carrier frequency of the demodulated signal voltage.

According to still another feature of the invention, the modifier stage interposed between the above-mentioned demodulator stage and the indicator in apparatus according to the invention, comprises two networks, namely a network for filtering the carrier frequency of the demodulated signal voltage and a network tuned in such a manner as to prefer various portions of the demodulated signal that contain the frequencies of the higher order.

The invention will be further described with reference to embodiments of sonor apparatus according to the invention illustrated by way of example in the accompanying drawings, wherein:

FIG. 4 shows schematically and in section a sea area for explaining the sounding conditions with a vertical direction of the sonic beam cone.

FIG. 5 is a graphic representation of an echo signal relating to the sounding conditions of FIG. 4.

FIG. 6 is a voltage-time diagram indicative of an echo signal according to FIG. 5 but corrected in accordance with the present invention.

Figure 2:
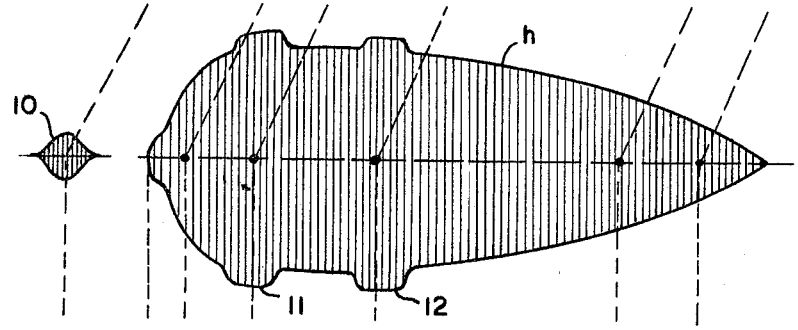
FIG. 2 shows schematically a graphic representation of an echo signal relating to the sounding conditions of FIG. 1.

FIG. 7 exemplifies schematically the appearance of an echo signal according to FIG. 2 on the image screen of a cathode-ray tube.

Figure 3:
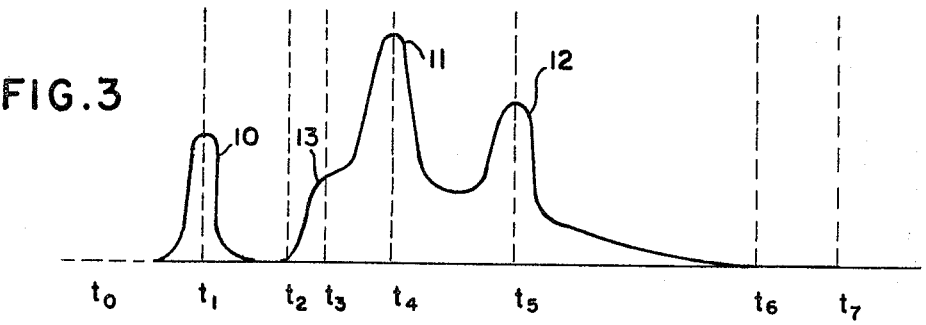
FIG. 3 represents a voltage-time diagram exemplifying an echo signal according to FIG. 2 but corrected in accordance with the invention.

FIG. 8 shows the echo signal of FIG. 3, corrected in accordance with the invention, likewise as it appears on the screen of a cathode-ray tube.

Figure 9:
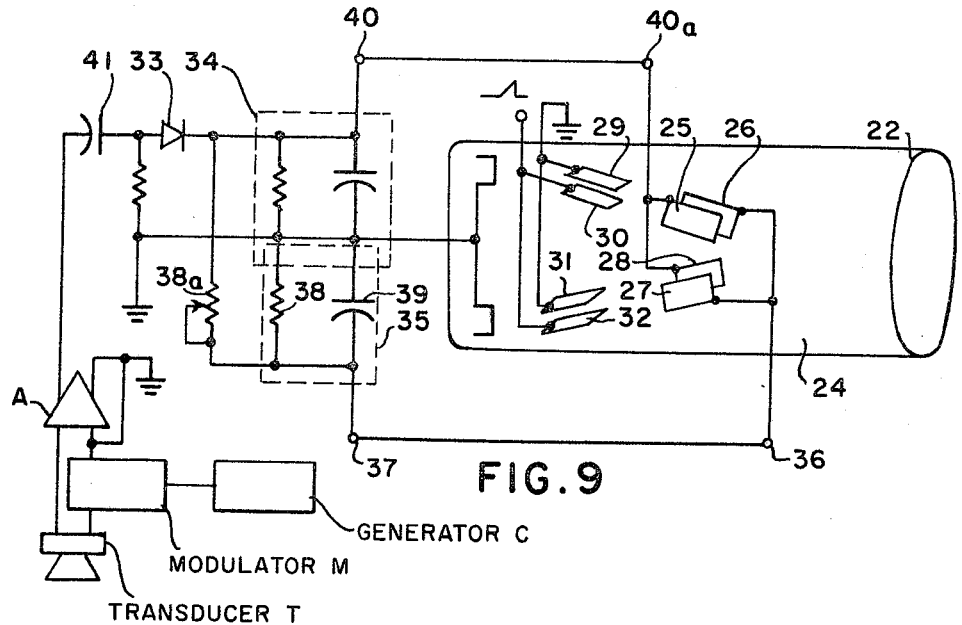

FIG. 9 is an example of a circuit diagram relating to sonar receiving apparatus according to the invention suitable for obtaining an echogram as exemplified by FIG. 8.

Figure 10:
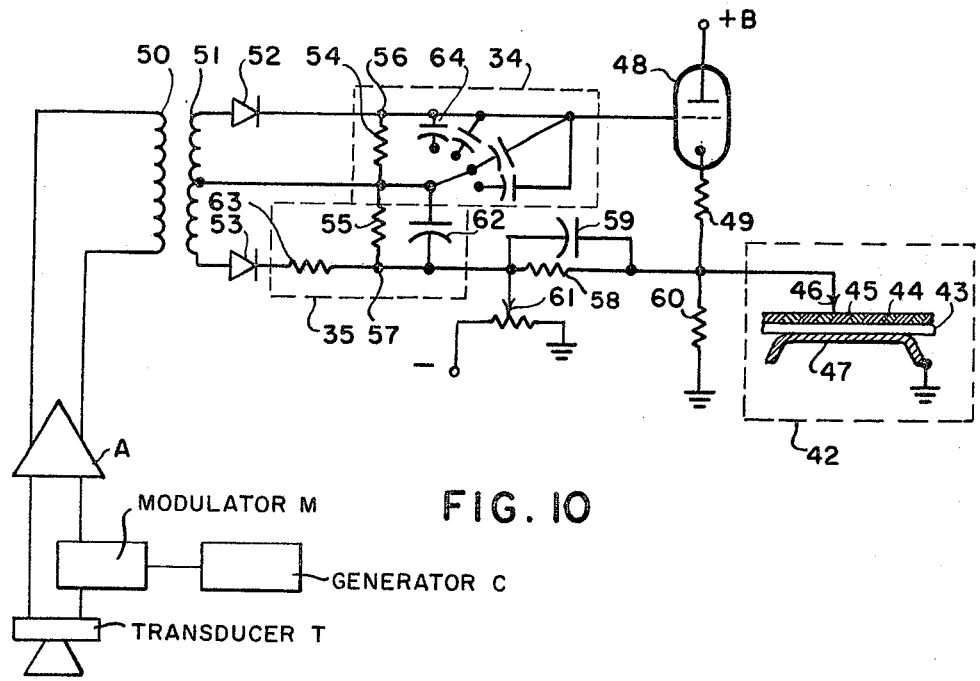

FIG. 10 illustrates another example of a circuit diagram for apparatus according to the invention operating with an image indication by means of electrically sensitive recording paper.

Figure 11:
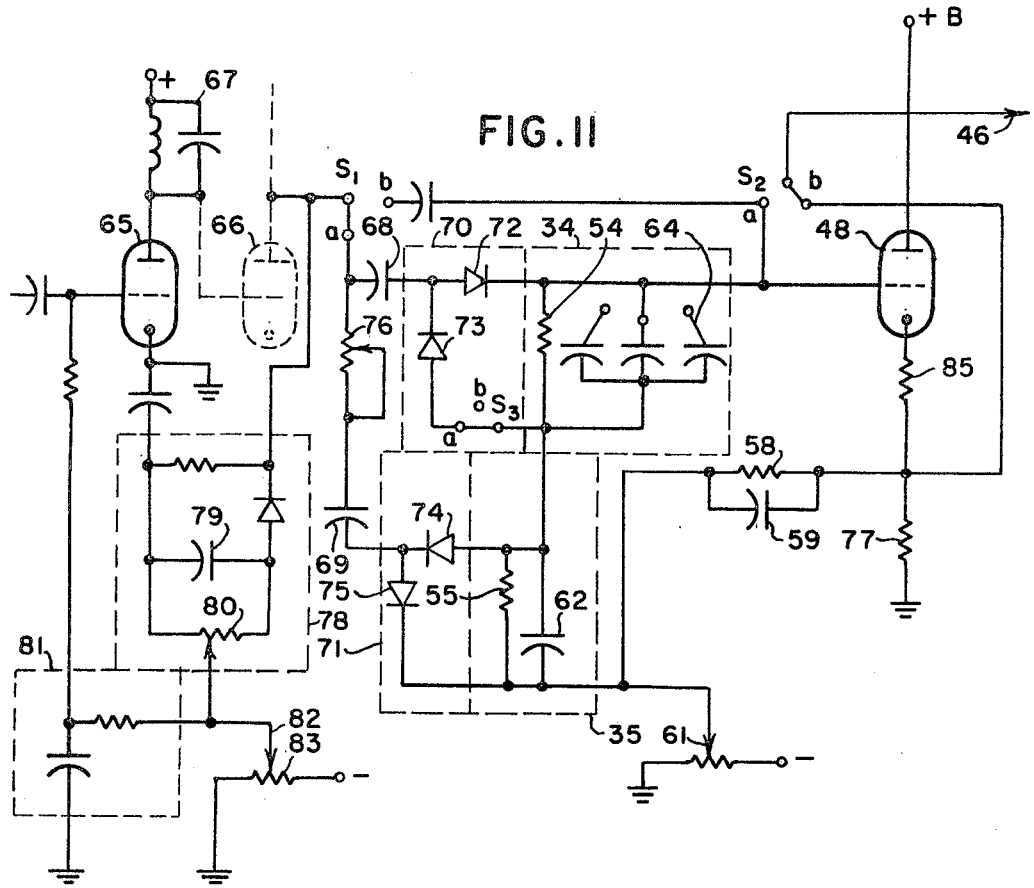

FIG. 11 shows the electrical circuit diagram of still another apparatus according to the invention.

Figure 12:
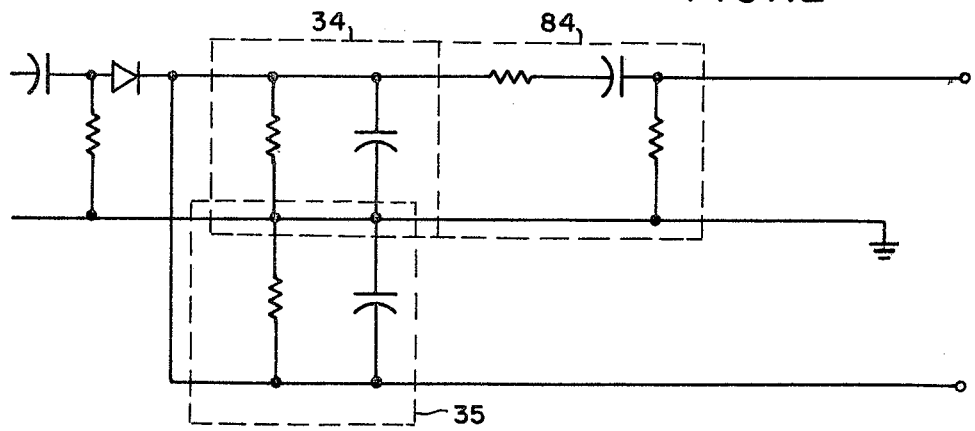

FIG. 12 shows a modification of apparatus otherwise similar to that of FIG. 10.

Figure 1:
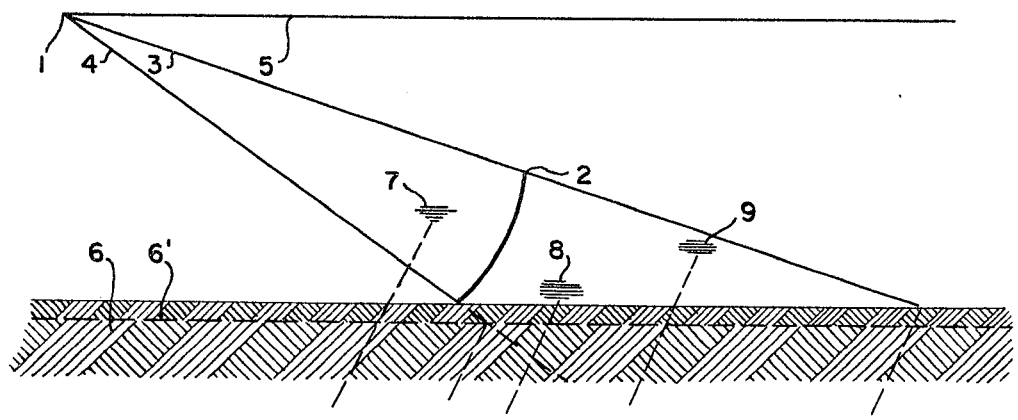
FIG. 1 shows schematically a vertical cross section through a sea area for explaining the sounding conditions obtaining with a sloping direction of the sonar beam.

According to FIG. 1, a beam of ultrasonic waves 2 is transmitted from a fishing vessel 1. The approximate boundaries of the beam cone within which the sound waves are propagated, are denoted by 3 and 4. The surface of the sea is indicated at 5. The sea bottom 6 is covered by a layer 6' of mud. Several schools of fish appear at 7, 8 and 9.

The sounding operation is performed in the conventional manner by transmitting from the vessel 1 a number of spaced transmitter pulses of which only one will be considered presently. Each transmitter pulse constitutes a wave train lasting a relatively short interval of time. At later moments, the sound waves impinge upon objects and some of their energy is reflected as echo pulses which arrive still later at the vessel 1 where the pulses are converted into a corresponding voltage in the receiving transducer. Since the travel speed of sound in water is known, the amount of time elapsing from the moment of transmission to the moment of echo reception permits determining the distance of the individual objects if the corresponding echo pulses are separately indicated. It will be recognized from FIG. 1, however, that echo pulses from different objects or different parts of one and the same objects, will arrive at the same time. This will be explained presently. The thickness of the one wave train 2 shown as a curved line in FIG. 1 is intended to signify the length, and hence the duration, of the wave train transmitted from the vessel. Although this wave train is rather short, it reaches the individual parts of an expensive object at successive moments. This results in a drawn-out echo signal which comprises the individual echo pulses stemming from the different objects, or from different parts or layers of an object. An example of such a complex single echo pulse is exemplified in FIG. 2.

The school of fish 7 first reached by the transmitted wave train produces echo pulse 10 at the moment $t_1$ which appears separately in the indicating device and hence is well discernible. This is because the transmitted pulse reaches no further object at the same time. The echo pulse 10 is illustrated with a purposely exaggerated amplitude to more clearly show the nature of its time curve.

When, at the moment $t_2$, the pulse reaches the uppermost boundary of the bottom area, another reflection occurs. Slightly later, the layers or parts of the sea bottom at greater depth also reflect echoes. The lateral points of the sea bottom are also reached at later moments, and so are the reflective strata below the surface of the bottom. Thus an echo signal comprising all of the individual echo pulses and having a relatively large amplitude and a long duration will ultimately result. In addition, at moments $t_4$ and $t_5$ there occur echo pulses 11 and 12 from the two schools of fish 8 and 9. These pulses are superimposed upon those already discussed. However the amplitudes of echo pulses 11 and 12 are small in comparison with the bottom-echo pulses so that they cannot be indicated in the known indicating devices separately from the bottom echo. This is particularly true if it is desired to observe the fish echoes 11 and 12 as regards their spatial relation to the echo pulse 10. In FIG. 2, the super-imposed fish echo pulses 11 and 12 are also shown with a greatly exaggerated amplitude. In reality, the conditions just described are considerably more unfavorable.

Now assume that the present invention is applied. As explained, for obtaining a clarified indication of the fish echoes 10, 11 and 12, the boundary of the comprehensive echo signal, and consequently the modulated echo signals, is thought of as being divided into individual time portions whose length along the time axis may be chosen largely at will. It is convenient to assume that each portion has approximately the length of one of the individual echo pulses, for example those denoted by 10, 11 or 12. If one applies the conventional method of analyzing the curve of the demodulated voltage on the Fourier principle into a fundamental frequency and in a number of integral multiples of this frequency, namely the harmonic upper frequencies generally called frequencies of the higher order, it will be recognized that the interesting echo pulses 10, 11 and 12 are all located in portions of the envelope that are steeper, or even involve a reversal in direction, than the curve portions correlated to bottom echoes only. That is, the interesting echo pulses are located in those curve portions that contain a larger share of higher-order frequencies than the echo signal portions corresponding to the sea bottom echo. Such a subdivision into a wave spectrum is carried out with electrical means still to be described and is employed for modifying and correcting the time curve of the echo signal. For example, the echo signal of FIG. 2 is thus corrected to a modified shape in which the interesting echo pulses 10, 11 and 12 are greatly augmented and emphasized, as exemplified by the diagram of FIG. 3 in which the ordinate represents time and the vertical extent denotes voltage amplitude. It will be seen that even the firmer surface of the sea bottom 6 reached at the moment $t_3$, is now distinct by a bulge 13 from the bulk of the echo signal so that the depth of the mud layer 6' can be recognized by sounding in a slanting direction.

As mentioned, FIG. 4 relates to vertical sounding. The above-described conditions of FIG. 1 result from that of FIG. 4 if the transducer aboard ship is tilted from vertical to slope sounding, or if the sea bottom does not extend horizontally but in a sloping direction, for example at the shelf edge. The train of sound waves 2 (FIG. 4) resulting from a single transmitter pulse exhibits by its indicated thickness the short length of the transmitter pulse and has a spherical shape. Consequently, with vertical sounding, too, the individual points of the sea bottom are not reached at the same moment although the sea bottom extends horizontally and thus in perpendicular relation to the center axis 4 of the sonic beam cone. In addition, the different layers 6' of the sea bottom, as well as any schools of fish 15, 16 and 17 contribute to producing a drawn-out echo signal comprising a multitude of individual echo pulses. Such an echo signal is exemplified in FIG. 5. The echo pulse 18 stemming from the school of fish 16 is still indicated with clarity. In practice, however, this is not the case with echo pulses 19 and 20 reflected from respective schools 15 and 17. The difficulty of obtaining a satisfactory indication increases greatly if it is desired to simultaneously observe all three echo pulses. It may happen that a school of fish 17 near the boundary 3 of the beam cone does not appear in the indicated image, although it is improbable that the visible school 16 happens to be more catchworthy than all of the others, or than the school 17 which is not seen at all.

By virtue of the invention, the time curve of the echo signal shown in FIG. 5 is modified and corrected as exemplified in FIG. 6 in the same manner as described above with reference to FIG. 3. Now, the fish echoes 18, 19 and 20 are clearly emphasized and the stratification of the sea bottom may also appear as a separate echo 21.

The unsatisfactory indication of echoes according to FIGS. 2 and 5 is apparent from FIG. 7. This illustration shows the image screen 22 of a cathode-ray tube. The time-proportional deflection is in the downward direction and is synchronized with the signal transmission so that the echoes are indicated by horizontal deflection only in the interval in which echoes of interest are to be expected. The individual oscillation periods of the non-demodulated echo signal are individually indicated so that they cause luminescence of a screen area whose envelope curve is supposed to indicate the objects being tracked.

The echoes 10 and 18 shown with exaggerated amplitudes in FIGS. 2 and 5, acquire a descernible magnitude only if the amplifying gain of the receiving amplifier is sufficiently high. With the necessarily high amplification, however, the edges of the echo pulses 23 stemming from the sea bottom pass beyond the confines of the screen 22. Consequently, the fish echoes 11, 12 or 20, likewise shown with exaggerated amplitudes in FIGS. 2 and 5, can no longer be indicated. On the other hand, if the amplifying gain is set to a lower value to keep the margin of the bottom-echo pulses within the area of the screen 22, then the above-mentioned echo pulses 11, 12 and 20 would nevertheless not be clearly distinct from the bottom-echo pulses.

FIG. 8, for comparison, serves to show the improvement obtainable by virtue of the invention. If desired, the modified and corrected voltage curve of the echo signals as shown in FIGS. 3 and 6 may be directly indicated. For example, the corrected voltage curve may be applied to the horizontal deflecter plates of a cathode-ray tube. Only the left or right half of the oscillogram then appears visible on the screen 22 according to FIG. 8. Since by virtue of the modifying correction, the interesting fish echoes 10, 11 12 or 18, 19, 20 then appear in the image with respective amplitudes of comparable magnitudes, they can be jointly made visible on the screen 22. They also are distinct from the portions of the echo signal that stem from the sea bottom. Furthermore, the luminescent spot of the image tube records or writes only the envelope curve and this is done at considerably lower speed than the conventional recording of the individual sound amplitudes, so that a much brighter image is obtained. This is particularly useful when mounting the image tube on the bridge of the vessel where it is necessary to observe the image in daylight.

As mentioned, a further improvement is obtained by first demodulating the echo signal comprising a totality of individual echo pulses, and thereafter modifying the demodulated signal by frequency-dependent modifier means which furnish two demodulated and corrected voltages. By applying these two voltages in phase opposition to the corresponding deflector electrodes of the cathode-ray tube, two demodulated and corrected envelope curves appear in mirror symmetrical relation on the screen relative to a time axis extending from the top downwardly. The image shown in FIG. 8 results in the manner just described.

An indication of this kind thus achieves the advantages of the modified voltage curves according to FIGS. 3 and 6 and combines them with the customary indication on the picture screen of a cathode-ray tube. However, in comparison with a conventional indication exemplified by FIG. 7, only the envelope curves of the echo voltages are indicated, and the speed of the luminescent spot or spots is lower than when indicating the echo signal without demodulation. By virtue of this lower tracing speed, the brightness of the oscillogram is physiologically increased. Furthermore, the demodulation and smoothing by filter means reduces fluctuations in the echo-signal curve so that the indication appears to be more quiet. The simpler shape of the curve also facilitates remembering the indication because a simpler figure is more easily memorized than a more complicated one. The advantages of greater brightness and better memorizability are particularly desirable for cathode-ray indication when sounding large depths or in a predominantly horizontal sounding direction, because then the sequence of the transmitter signals is relatively low, and an observation of the image from a relatively large distance and also on a usually bright illuminated bridge of a vessel is desirable.

Described in the following are various embodiments of apparatus for performing the above-described method according to the invention. It will be remembered that in FIGS. 3 and 6 the echo signal is already demodulated, this being apparent from the fact that only the envelope curve is shown. Furthermore, as explained with reference to FIGS. 2 and 5, the marginal curve of the non-demodulated echo signal can be subdivided into portions of which each is composed of a Fourier series of frequencies whose main components are in different orders. The envelope curve $h$ in FIG. 2 or 5 represents relatively low frequencies in comparison with the other portions of the same signal; and the echoes 11, 12 and in a broader sense also the echo 10, protrude from the rather shallow curve $h$ along relatively short distances and have rather steep slopes, thus revealing a larger share of higher harmonic frequencies in the signal portions containing the fish echo pulses. Likewise the echo curve relating to the harder sea bottom 6, in comparison with the mud layer 6′, reveals a steeper slope in the corresponding portion of the echo signal and consequently a steeper course of the envelope curve and a larger share of upper harmonics.

As explained, a sonar apparaus according to the invention is to have the effect of preferring the echo signal portions which have the frequencies of the higher order and/or conversely reducing the amplitudes in the portions predominantly characterized by frequencies of the lower order. This preferential modification for emphasis upon the higher-order frequencies is effected with the aid of one or more compensating voltages. The devices described presently with reference to FIGS. 9 to 12 operate in this manner.

The apparatus of FIG. 9 comprises a sonic transducer T which receives the sound echoes and converts them to an electrical signal voltage which, for example, modulates a carrier frequency supplied from a suitable generator stage C. The transducer T and the generator stage C are connected to the inputs of a modulator M. The resulting voltage produced at the output of the modulaotr M is amplified in an amplifier A. The apparatus is equipped with a cathode-ray tube whose image screen is denoted by 22. The tube operates with two electron beams in known manner. If desired, other known devices for the simultaneous indication of two phenomena may be used, for example electronic switches for recording or writing the two oscillograms successively but keeping them simultaneously visible due to the afterglow effect. The tube has two systems for horizontal deflection and two systems for vertical deflection, both pairs of systems operating on the respective electron beams. The two plates for horizontal deflection in one system are denoted by 25 and 26. The corresponding pair of plates in the other system is denoted by 27 and 28. The pair of plates for vertical deflection in one system is denoted by 29 and 30, the corresponding other pair for vertical deflection in the second system by 31 and 32. The two deflector systems according to FIG. 9 are mounted above one another. If desired, they may be mounted horizontally beside each other, although the illustrated arrangement is preferred because it results in a simplification of the tube control.

According to FIG. 9 the tube 24 serves not only for indication but simultaneously for modifying the echo signal by means of a compensating voltage. The horizontal deflector plates are utilized for this purpose. The positive demodulated echo signal is impressed upon one of the plates 25 (or 28) and the positive compensating voltage is impressed upon the other plate 26 (or 27).

Conventionally, one of the two input terminals of indicating devices is grounded, the indicating voltage being applied to the other input terminal. This manner of applying voltage is used in the embodiments described hereinafter with reference to FIGS. 11 and 12. The embodiment of FIG. 9, however, operates in a different manner in order to provide for corrective modification of the echo signal within the indicating device itself. For this purpose, neither input terminal of the indicator device is grounded. One is impressed with the modified signal voltage, and the other with an opposingly poled compensating voltage. As a result, only the difference between the two voltages and consequently a corrected echo signal is indicated.

The echo signal voltage supplied from the amplifier A is first demodulated by passing it through a diode 33. Connected to the outpuut terminal of the diode 33 is a network 34 at whose output terminal 40 the demodulated echo signal voltage appears relative to ground. The demodulated signal voltage is applied to the input terminal 40a of the indicating device.

The compensating voltage is derived from the echo signal voltage. For this purpose, part of the echo signal voltage is branched off at the output of the diode 33 and is supplied to a second network 35 at whose output terminal 37 the compensating voltage appears relative to ground. The compensating voltage is applied to the second input terminal 36 of the indicating device. The part of the voltage branched off the echo signal voltage is adjusted by means of a variable resistor 38a.

For obtaining the compensating correction of the echo signal voltage in accordance with the invention, the demodulated echo signal voltage and the compensating voltage, both being referred to ground, are thus applied to the respective two input poles of the indicating device so that the demodulated echo signal voltage in the indicating device is not referred to ground but to the compensating voltage.

The network 34, connected bewteen the demodulating diode 33 and the indicating device, serves for filtering the carrier frequency. The network 35, like the network 34, is essentially composed of a resistor 38 and a parallel connected capacitor 39. The time constant of network 35 is such that the compensating voltage appearing at output terminal 37 compensates the parts of the demodulated echo signal which predominantly contain frequencies of the lower order. For this purpose, the time constant of the RC network 35 is larger than the time constant of the filter network 34.

It will be noted that the two pairs of deflector plates which form part of the two electron-ray systems of the tube 24 are alternately controlled by the two voltages issuing from the networks 34 and 35. The corresponding two pairs of vertical deflector plates 29 and 30, and 31 and 32 are connected to a source of saw-tooth voltage in the conventional manner.

The apparatus operates as follows:

The echo signal demodulated by the diode 33 is derived from its carrier frequency as it passes through the network 34 acting as an integrator. The envelope curve of the echo signal thus appears at the output terminal 40 of the network 34. This voltage is impressed upon the plates 25 and 28 of the respective two pairs serving for amplitude indication. The network 35 produces a compensating voltage for the echo signal part stemming from the sea bottom, and this voltage is impressed upon the two other plates 26 and 27 of the respective two deflector systems for amplitude indication.

Only the difference of the two voltages between terminals 40 and 37 becomes effective at the plate pairs 25 and 26, and 27 and 28. The sawtooth voltage at plates 30 and 32 causes the two luminescent spots to pass on screen 22 downwardly along the vertical diameter. This motion, and hence the sawtooth wave, is started simultaneously with the transmission of the transmitter pulse or at a time point adjusted to a selected later moment, so that only the interesting vicinity of the echo signal becomes visible on the screen. This delayed triggering of the sawtooth at a given distance from the starting moment may be controlled by a multivibrator, for example. If the sawtooth voltage were alone effective, it would cause both luminescent spots to repeatedly move vertically downward on the diameter of the screen 22. However, the voltages applied to the plate pairs 25 and 26, and 27 and 28 cause the two spots to be laterally deflected so that, for example, the image shown in FIG. 8 will result.

Assume that a voltage corresponding to an echo reflected from fish located closely above the sea bottom is applied to the plates. For this particular part of the echo signal, the network 35 does not operate rapidly enough to furnish a countervoltage so that, although one luminescent spot is deflected by action of the plate 25 to the left and the other spot by action of plate 28 to the right away from the vertical diameter, the deflection is not made partially ineffective by the action of plate 26 or 27.

On the other hand, if a part of the echo signal corresponding to the bottom echo is being received, the network 35 permits the passage of a voltage which acts in opposition to the voltage passing through the network 34. The countervoltage reaches the plates 26 and 27 and counteracts the above-described deflection by action of plates 25 and 28 due to the voltage at terminal 40. Consequently, now the deflection from the vertical diameter on screen 22 corresponds only to the difference between the voltages at terminals 37 and 40, respectively. As a result, the echo portions stemming from the sea bottom are considerably weakened or suppressed. Thus, the indication of schools of fish located closely above the sea bottom is considerably emphasized on the resulting image in accordance with the results desired by the present invention.

Similar conditions obtain with schools of fish closely below the water surface 5 so that in this case, too, the invention affords an improvement in distinctively exhibiting the schools on the indicated image.

The above-mentioned transducer serves also for transmitting the transmitter signals in the conventional manner. The signal, upon selective amplification in amplifier A, passes through an isolating capacitor 41 before it reaches the demodulator diode 33. While the networks 34 and 35 in FIG. 9 are shown directly connected with each other and with the cathode-ray tube, the circuit may be modified in various respects. For example, one or more amplifying or control tubes or corresponding transistors may be connected between the image tube and one or both of the modifier networks. If desired, other known indicator devices, for example chart recorders, may be employed. A recorder of the latter type is used in the embodiment described presently with reference to FIG. 10.

Shown at 42 in FIG. 10 is a recorder for electrically sensitive paper 43. Such paper comprises a conducting black backing layer 44 covered with an opaque recording layer 45. A stylus 46 passes across the paper in periodic succession corresponding to the sequence of the sonar transmitter pulses, while the paper advances in a direction perpendicular to the stylus travel. During its travel, the stylus point is energized by voltage pulses and thus produces recording marks at respective localities corresponding to the distance of the objects from which echoes are being reflected. If a sufficient voltage is applied to the stylus 46, a current passes from the stylus to a countercontact 47, and the stylus then burns a hole into the cover layer 45 so that the dark background becomes visible. The recording or writing current is furnished from a power tube 48 which is preferably so connected that it possesses a small dynamic output resistance, but by virtue of a cathode resistor 49, prevents excessive burning of the recording paper.

In the embodiment of FIG. 10, the difference between the two demodulated and modified voltages is provided with the aid of a transformer 50, 51. The amplified echo signal is applied to the primary winding 50 of the transformer. The secondary winding 51 is center-tapped. The resulting two circuits comprise respective diodes 52 and 53 which rectify the signal voltage and thus provide a demodulated voltage. The resistor 54 has a positive voltage drop, measured against the center tap of the secondary winding 51. A corresponding resistor 55 analogously provides a negative direct voltage. The positive terminal point 56 is connected with the control grid of the tube 48 in the direct current end stage. The negative terminal 57 is connected through an RC circuit 58, 59 with the cathode of tube 48. The cathode resistor 49 is preferably adjustable. It limits the maximal current through tube 48 and thus effects a flattening in the gray-graduation of the recordings on the chart paper. A resistor 60 is connected in shunt relation to the paper resistance effective between the stylus 46 and the backing 47 of the recorder 42. The resistor 60 is to take care that, when the stylus 46 is lifted off the paper, the cathode of tube 48 remains grounded. The current then flowing from cathode to ground is pre-adjusted by means of an adjustable negative bias voltage of a potentiometer 61 applied between the grid and the cathode of the tube 48.

Interposed between the modulator stage 52, 53 and the indicator are the above-mentioned two networks 34 and 35. The time constant of network 35 is determined by a resistor 55, a capacitor 62 and a series-connected resistor 63. The resistor 63 serves to increase the time constant and also permits adjusting the effective voltage. The total time constant of network 35 is so chosen that the voltage at the negative terminal 57 can only slowly follow the changes of the demodulated echo signal so that essentially only the signal parts corresponding to the bottom echo are permitted to pass through.

The network 34, which like network 35 acts as an integrator, has its time constant determined by the resistor 54 and by a selected one of a group capacitors 64. This time constant is rated smaller than that of network 35 and is selectively adjustable by means of a switch which connects one or the other of a group of capacitors 64 in parallel relation to the resistor 54. The positive voltage which passes through the network 34 follows the demodulated echo signal more or less without inertia, but in any event with less delay than the negative voltage passing through the network 35.

The sum of the tube-controlling voltages, that is the difference of their respective absolute values, is effective between cathode and grid of the end-stage tube 48. In addition, a fixed but adjustable bias voltage from the potentiometer 61 is effective in series. With a constant input voltage at transformer 50, 51, the resultant voltage between grid and cathode of tube 48 depends only upon the manually adjustable bias at the potentiometer 61. When the input voltage increases, for example on account of a fish echo, the upper, positive control voltage at resistor 54 increases more rapidly than the lower, negative control voltage at the resistor 55. Consequently, the resulting instantaneous voltage is positive. Thus, there occurs a positive voltage at the output of tube 48 which causes intensive blackening of the paper in recorder 42.

Depending upon the selected capacitor 64, more or fewer details of the echo signal are recorded. This affords optimal adaptation to particular sounding conditions. When the time constants of respective networks 34 and 35 approach equality, the resultant difference voltage decreases, but the resolving power simultaneously increases. The absolute value of the positive, upper control voltage from network 34 ultimately determines the maximal resolving power.

When the capacitors 64 are completely switched off, the apparatus operates to automatically displace the working point of tube 48 under control by the portions of the demodulated signal voltage corresponding to the sea bottom echo. This prevents undesirable overcontrol. This particular mode of operation is selectively applicable without any additional means. It is therefore within the scope of the present invention to make at least one of the time constants adjustable from zero up to a maximal value. Preferably at least one of the networks is selectively switchable into and out of active condition. An example of the latter type is shown in FIG. 11 and is hereinafter described.

In the embodiment of FIG. 11, which shows only the circuitry connected between the transducer stage and the indicator or recorder stage shown in FIGS. 9 or 10, at least one of the networks 34 and 35 is provided with a voltage doubling circuit 70 and 71, respectively. This permits a better utilization of the demodulated echo signal, as well as reducing the difference between the two time constants for a given value of difference voltage, thus increasing the resolving power.

According to another feature of the invention, a regulating voltage for an echo amplifier is derived from the demodulated echo signal, the regulating voltage being essentially responsive to the amplitude of the echo signal. Such a regulating voltage permits equalizing, for example, any fluctuations of the echo signal as may result from rolling and yawing of a vessel.

If desired, the dependence of the echo amplitude upon the distance of the object may additionally be compensated by a time-dependent regulation of the amplifying gain. It is known to employ for such purposes a tube circuit in which a negative, decaying pulse causes the amplifying gain to increase with time and hence with an increasing distance of a reflective object, and to reach a given maximal value upon elapse of an adjustable period.

The echo signal received by the transducer is first amplified in an amplifier which FIG. 11 shows as tube 65 and also indicates another tube 66. Resonant circuits are connected in the input and anode leads of the amplifier tubes, only one of these tank circuits being shown at 67. The amplified echo signal passes through a switch $S_1$. When the switch is in position $a$, the signal passes through a network according to the invention. When switch $S_1$ is in position $b$, the signal directly reaches the grid of an end-stage tube 48. Another switch $S_2$, when in position $b$ connects the stylus 46 (FIG. 10) to the cathode output lead of the tube 48, and when in position $a$ connects the stylus to the preceding circuitry, thus bypassing the tube 48.

With switch $S_1$ in the illustrated position $a$, the amplified echo voltages pass through two coupling capacitors 68 and 69 to respective rectifier circuits 70 and 71 which comprise diodes 72 to 75 connected in pairs 72 and 73, and 74 and 75 to act as voltage doublers. Thus, a positive control voltage is impressed upon a resistor 54 and a negative control voltage upon a resistor 55. These two resistors correspond to those denoted by the same reference numerals in FIG. 10, and are connected with respective capacitors 64 and 62. As explained, the positive and negative control voltages are dependent upon the different time constants of the two networks and result in a difference voltage which controls the grid of the tube 48 in the sense required by the present invention. However, by virtue of the diodes 73 and 75, twice the voltage value is obtained. When the respective time constants of the two networks 34 and 35 approach equality, the resolving power increases but the resulting difference voltage decreases. On the other hand, a given minimal voltage value must be applied to the grid of tube 48 for properly controlling the indicating device. For both reasons, the use of voltage doubling in the networks 34 and 35 according to the invention has the advantage that the difference between the respective time constants can be made smaller than is otherwise possible. As a consequence, the resolving power increases, but the indicating device remains fully controllable.

If desired, only one of the two networks 34 and 35 may be used for voltage doubling in order to intensify the voltage modifying effect of the other network. For operating in this mode, a selector switch $S_3$ for at least one of the voltage doubling diodes is shown provided in network 34. With switch $S_3$ in position $b$, the diode 73 is switched off and this network does not cause voltage doubling, so that the compensating voltage of network 35 gains in influence. This is especially advisable if the two networks 34 and 35 are dimensioned for only a slight compensation. The switch $S_3$ then permits a coarse switching to stronger compensation which may then be further augmented by a corresponding selection among the capacitors 64.

A potentiometer rheostat 76 permits a further adaptation to different sounding conditions by varying the share of the echo signal supplied to each network, thus also adjusting the share which each network contributes to the resulting control voltage.

The potentiometer 61 adds to the resultant voltage an adjustable bias voltage which, however, depends upon the echo signal. Thus, the plate current of the tube 48 is controlled by the two mutually opposed direct voltages from networks 34 and 35 and also by the bias voltage acting through the resistor 58. The negative bias is adjusted by the potentiometer 61 so that the cathode of tube 48 receives through resistor 85 a positive potential of about 40 volts relative to ground when plate current flows through the tube. This voltage does not yet cause blackening of the paper in the echo recorder. With increasing amplitude of the demodulated echo signal, the resultant voltage increases due to the change of voltages impressed upon the resistors 54 and 55. This makes the grid potential of tube 48 more positive, so that the plate current increases and a higher voltage than 40 volts appears at the stylus-voltage terminal of the resistor 77. The threshold value of the paper is then exceeded and a recording mark is produced in the known manner by blackening the paper as the stylus 46 travels across the paper at the frequency of the transmission pulse sequence.

As mentioned, the potentiometer rheostat 76 permits adjusting the share of compensating voltage produced at resistor 55. When the slider of rheostat 76 is placed near the upper end, the resulting compensating voltage is very low so that the recording or writing voltage applied to the recording paper is substantially a linearly proportional function of the demodulated echo signal. When the slider of rheostat 76 is moved downwardly, there occurs a negative compensating voltage which correspondingly reduces the positive voltage occurring at resistor 54. The recording or writing voltage is then no longer in linear proportion to the demodulated echo signal but is a function of the difference between the two direct voltages produced in the integrating networks 34 and 35, respectively. When correspondingly adjusting the division ratio of resistors 54, 55 and 76, only the parts of the demodulated echo signal which predominantly contain frequencies of the higher order will be recorded.

In the embodiment of FIG. 11, the regulating voltage for the signal amplifier is derived by the network 78 from the echo signal, in addition to the compensating voltage produced by network 35. In network 78, the partial voltage derived from the echo signal is rectified and smoothed. The time constant of the integrating member 79, 80 is made sufficiently large, and the series-connected smoothing member is likewise rated for integrating, the entire echo signal corresponding, for example, to the one represented in FIG. 2 or FIG. 5. The modified signal voltage which is approximately constant for the duration of an echo signal, is superimposed upon a bias voltage in a lead 82 applied as a bias to the grid of the regulating amplifier tube 65. Both bias voltages are adjustable, the bias voltage in the lead 82 with the aid of a potentiometer 83, and the negative control voltage by means of the potentiometer 80. If, for example, the slider of potentiometer 80 is in the left end position, only the fixed bias voltage in the lead 82, but no feedback regulation, is effective.

The performance of the regulation can be augmented in known manner by having it act upon further stages of the signal amplifier. Only one of such further stages is indicated as an amplifier tube 66. This tube is regulated in the same manner as the amplifier tube 65, although this is not further shown in the drawing.

Networks for use in circuits according to the invention may be given a variety of designs and arrangements other than as described. For example, such a network may be composed of high-pass and low-pass stages which are connected with each other or are separated by interposed other stages. For example, FIG. 12 shows an embodiment in which a high-pass stage 84 is connected to the two networks 34 and 35 according to FIG. 9 or 11. The network 34 for filtering the carrier frequency is serially followed by the high-pass filter 84 which more or less impedes the lower-order frequency portions of the demodulated echo signal. This aids and improves the desired effect of the networks 34 and 35.

The invention is not limited to sonic transducers having a relatively broad directional beam characteristic, but is also advantageously applicable in addition to sonar transducers with a more sharply bunched directional beam. In the latter case, the invention further improves the resolving power already increased by the narrower beam angle.

To those skilled in the art, it will be obvious upon a study of this disclosure that my invention permits of various other modifications and may be given embodiments different from those particularly illustrated and described herein, without departing from the essential features of my invention and within the scope of the claims annexed hereto.

I claim:

1. The sonar method for distinct indication of echoes reflected from different and multi-layer objects, which comprises demodulating the echo signal voltage forming the totality of individual echo pulses, supplying the demodulated signal voltage to network means having at least two different time constants, modifying the voltage amplitude of the demodulated signal voltage in parts in opposite directions by the network means, augmenting the voltage amplitude of the demodulated signal parts having frequencies of higher order relative to the other parts having lower order frequencies by filtering the demodulated signal voltage in accordance with a first of the different time constants of said network means, reducing the voltage amplitude of the other parts of the demodulated signal voltage having lower order frequencies by filtering the demodulated signal voltage in accordance with a second of the different time constants of said network means, and applying the modified signal voltage for emphasized indication of otherwise insufficiently indicated fish near the sea bottom and other reflective inhomogeneities.

2. The sonar method for distinct indication of echoes reflected from different and multi-layer objects, which comprises translating received sonar echoes into a signal voltage containing the totality of individual echo pulses, demodulaitng the signal voltage, supplying the signal voltage to first and second networks each having a time constant different from the other, filtering the signal voltage by the first network thereby augmenting parts of said signal voltage having frequencies of higher order relative to the other parts having lower order frequencies, filtering the signal voltage by the second network thereby providing a compensating voltage for the lower order frequency parts of the signal voltage, modifying the signal voltage filtered by said first network by said compensating voltage thereby reducing the amplitudes of the lower order frequency parts of the signal voltage filtered by said first network in the modified voltage relative to the augmented amplitudes of the higher order frequency parts, and applying the modified signal voltage for emphasized indication of the otherwise insufficiently indicated fish near the sea bottom and other reflective inhomogeneities.

3. The sonar echo indicating method according to claim 2, further comprises applying ground potential as a reference relative to the demodulated signal voltage and compensating voltage and controlling the echo indication in dependence upon the difference between said demodulated signal voltage and said compensating voltage.

4. The sonar echo indicating method according to claim 2, which further comprises applying ground potential as a reference relative to the demodulated signal voltage and compensating voltage and impressing said compensating and demodulated signal voltages upon the two input poles of a subsequent stage for controlling said stage by said demodulated signal voltage relative to said compensating voltage.

5. The sonar method for distinct indication of echoes reflected from different and multi-layer objects, which comprises translating received sonar echoes into a signal voltage containing the totality of individual echo pulses, demodulating the signal voltage, supplying the signal voltage to two networks having respectively different time constants, deriving two separate voltages having different respective time curves from said networks by filtering the signal voltage in accordance with the time constants of said networks, one of said separate voltages including lower order frequency parts of said signal voltage relative to the other parts having higher order frequencies and augmented higher order frequency parts and the other of said separate voltages including only the lower order frequency parts of said signal voltage, and controlling the echo indication by conjointly applying said two derived voltages with mutually opposed polarities.

6. The sonar method for distinct indication of echoes reflected from different and multi-layer objects, which comprises demodulating the echo signal voltage forming the totality of individual echo pulses, amplifying the demodulated signal voltage, supplying the demodulated signal voltage to network means having at least two different time constants, modifying the amplitudes of the demodulated signal voltage in parts in opposite directions by the network means, augmenting the voltage amplitude of the demodulated signal parts having frequencies of higher order relative to the other parts having lower order frequencies by filtering the demodulated signal voltage in accordance with a first of the different time constants of said network means, reducing the voltage amplitude of the other parts of the demodulated signal voltage having lower order frequencies by filtering the demodulated signal voltage in accordance with a second of the different time constants of said network means, controlling the amplifying gain in dependence upon the echo signal voltage and substantially in accordance with the amplitude thereof, and applying the controlled amplified voltage for emphasized indication of otherwise insufficiently indicated fish near the sea bottom and other reflective inhomogeneities.

7. Sonar apparatus for distinctly indicating echoes reflected from different and multi-layer objects, comprising a signal input stage for providing an echo signal voltage forming the totality of individual echo pulses, a demodulator stage connected to said signal input stage for demodulating the signal voltage, a frequency-dependent amplitude modifier stage connected to said demodulating stage for modifying the demodulated signal voltage, said modifier stage comprising network means having at least two different time constants for augmenting the voltage amplitude of the demodulated signal voltage parts having frequencies of higher order relative to the other parts having lower order frequencies by filtering the demodulated signal voltage in accordance with a first of the different time constants of said network means and for reducing the voltage amplitude of the other parts of the demodulated signal voltage having lower order frequencies by filtering the demodulated signal voltage in accordance with a second of the different time constants of said network means, and echo indicating means connected to said modifier stage and controlled by the modified voltage for emphasized indication of otherwise insufficiently indicated targets.

8. Sonar apparatus for distinctly indicating echoes reflected from different and multi-layer objects, comprising a signal input stage for providing an echo signal voltage forming the totality of individual echo pulses, a demodulator stage connected to said signal input stage for demodulating the signal voltage, a modifier stage connected to said demodulator stage and comprising band pass means having a pass frequency band between the carrier frequency and the fundamental frequency of the demodulated signal voltage for augmenting the voltage amplitude of the demodulated signal voltage parts having frequencies of higher order relative to the other parts having lower order frequencies and for reducing the voltage amplitude of the other parts of the demodulated signal voltage having lower order frequencies, and echo indicating means connected to said modifier stage and controlled by the modified voltage for emphasized indication of otherwise insufficiently indicated targets.

9. Sonar apparatus according to claim 8, wherein said signal input means comprises a transducer for providing said echo signal voltage, and the band pass means of said modifier stage comprises a filter network connected between said demodulator stage nad said echo indicating means.

10. Sonar apparatus for distinctly indicating echoes reflected from different and multi-layer objects, comprising a signal input stage for receiving an echo signal voltage having a carrier frequency and constituting the totality of individual echo pulses, demodulating diode means connected to said input stage for demodulating the signal voltage, a first network for filtering the carrier frequency connected to said diode means, a second network connected parallel to said first network for deriving from the demodulated signal voltage a compensating voltage for the lower order frequency parts of the demodulated signal voltage, and echo indicating means, said first and second networks having respective output terminals connected in voltage opposed relation to said indicating means for controlling it for emphasized indication of otherwise insufficiently indicated targets.

11. In sonar apparatus according to claim 10, said second network comprising a resistor and a capacitor connected parallel to each other and having a time constant greater than that of said first network.

12. Sonar apparatus according to claim 11, comprising a high-pass filter connected between said first network and said indicator means for impeding the passage of lower order frequency parts through said first network.

13. In sonar apparatus according to claim 10, at least one of said networks comprising a voltage doubler circuit.

14. In sonar apparatus according to claim 10, at least one of said networks comprising a voltage doubler circuit, and switch means for selectively connecting and disconnecting said voltage doubler circuit relative to said one network.

15. Sonar apparatus according to claim 10, comprising selective switch means connected with at least one of said two networks for connecting and disconnecting it relative to the signal echo voltage.

16. Sonar apparatus according to claim 10, comprising control means connected with at least one of said networks for adjusting its time constant between zero and a given maximum.

17. Sonar apparatus according to claim 10, comprising adjustable potentiometer means interposed between said signal input stage and said network for adjusting the share of the echo signal voltage supplied to each of said networks.

18. Sonar apparatus for distinctly indicating echoes reflected from different and multi-layer objects, comprising a signal input stage for providing an echo signal voltage forming the totality of individual echo pulses, a demodulator stage connected to said input stage for demodulating the signal voltage, a frequency-dependent amplitude modifier stage connected to said demodulating stage for modifying the demodulated voltage by relatively augmenting the higher order frequency parts of the demodulated voltage with respect to the lower order frequency parts, said modifier stage having two output voltages of mutually opposed phase relation, a cathode ray indicator tube having an image screen and two deflector systems connected to said two output voltages for producing two demodulated and modified envelope curves in mirror symmetrical positions on said screen.

19. In sonar apparatus according to claim 18, said tube having two mutually adjacent cathode ray systems of which each has a pair of horizontal deflector plates and a pair of vertical deflector plates to jointly produce an image on said screen, said two output voltages being alternately connected to said horizontal deflector plates of said respective systems, and a sawtooth voltage circuit connected to said vertical plates of both said systems.

References Cited
UNITED STATES PATENTS

| | | | |
|---|---|---|---|
| 2,558,868 | 7/1951 | McCarty | 346—33 |
| 2,728,900 | 12/1955 | Ross | 340—3 |
| 2,987,701 | 6/1961 | Grannemann | 340—15.5 |
| 3,098,210 | 7/1963 | Sparling et al. | 340—3 |
| 3,109,154 | 10/1963 | Grada et al. | 340—3 |
| 3,174,127 | 3/1965 | Haslett | 340—3 |

RODNEY B. BENNETT, *Primary Examiner.*

RICHARD A. FARLEY, *Examiner.*